(12) United States Patent
Racine

(10) Patent No.: US 6,907,781 B2
(45) Date of Patent: Jun. 21, 2005

(54) WHEEL BALANCING SYSTEM WITH INTEGRATED WHEEL LIFT, LOADED MODE TESTING, AND WHEEL IMAGING SYSTEM

(75) Inventor: Ron Racine, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 74 days.

(21) Appl. No.: 10/287,638

(22) Filed: Nov. 5, 2002

(65) Prior Publication Data

US 2004/0083810 A1 May 6, 2004

(51) Int. Cl.[7] .............................................. G01M 1/16
(52) U.S. Cl. .............................. 73/462; 73/475; 73/487
(58) Field of Search ........................... 73/46, 462, 475, 73/487

(56) References Cited

U.S. PATENT DOCUMENTS

| | | | |
|---|---|---|---|
| 3,824,862 A | * 7/1974 | Branick | 73/480 |
| 3,922,922 A | * 12/1975 | Goebel | 73/462 |
| 4,238,954 A | 12/1980 | Langer | |
| 4,741,211 A | 5/1988 | Borner et al. | |
| 4,998,436 A | * 3/1991 | Kaizu et al. | 73/117 |
| 5,209,116 A | * 5/1993 | Okumura | 73/462 |
| 5,385,045 A | * 1/1995 | Mannen et al. | 73/462 |
| 5,419,193 A | * 5/1995 | Borner et al. | 73/462 |
| 5,739,427 A | * 4/1998 | Yamaya et al. | 73/117 |
| 6,069,966 A | * 5/2000 | Jones et al. | 382/100 |
| 6,336,364 B1 | 1/2002 | Parker et al. | |
| 6,405,591 B1 | 6/2002 | Colarelli, III et al. | |
| 6,439,049 B2 | 8/2002 | Colarelli, III et al. | |
| 2001/0032499 A1 | 10/2001 | Jenniges et al. | |

FOREIGN PATENT DOCUMENTS

WO    WO 00/77485 A2    12/2000

OTHER PUBLICATIONS

Balco, Inc. Product Literature–"balco 995 Ergosonic Automatic Computer Wheel Balancer", Form No. 8243 Rev. A, dated Jun. 1992.

* cited by examiner

*Primary Examiner*—Hezron Williams
*Assistant Examiner*—John Hanley
(74) *Attorney, Agent, or Firm*—McDermott Will & Emery LLP

(57) ABSTRACT

An apparatus for determining balancing information of an object in rotation comprises a base, an arm, a spindle, at least one force sensor, a rolling road, a controller, and an actuator. The arm is rotatably connected to the base about a pivot axis. The spindle is positioned on the arm and receives and rotates the object. The force sensor detects forces generated by the object during rotation of the object. The rolling road includes a surface upon which the object can be positioned. The controller receives force information from the sensor and calculates the balancing information from the force information. An actuator connected to both the arm and the base moves with the movement being controlled by the controller. The object can be a wheel.

19 Claims, 4 Drawing Sheets

WHEEL BALANCING SYSTEM WITH INTEGRATED WHEEL LIFT, LOADED MODE TESTING, AND WHEEL IMAGING SYSTEM

FIELD OF THE INVENTION

The present invention relates generally to motor vehicle alignment and, more specifically, to an apparatus integrating a wheel lift and a loaded mode testing mechanism.

BACKGROUND OF THE INVENTION

Motor vehicle alignment systems are important for ensuring that the alignments of wheels on a vehicle are within the specifications provided by motor vehicle manufacturers. If the wheels are out of alignment, there may be excessive or uneven wear. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim."

Many different types of apparatus have been developed to obtain balancing information for a wheel. One balancing apparatus currently in use involves mounting a wheel on a spindle. The spindle and wheel are then rotated, and forces generated by the wheel are measured to obtain such information as tire and/or rim lateral and radial runout and improper bead seating of the tire on the rim.

The balancing apparatus also simulates a road test by applying a radial force or load to the wheel while the wheel is rotating. From the simulated road test, a measure of tire uniformity is obtained. Tire uniformity is the change in the sidewall and footprint as the force is exerted against the tire. In a current system, a roller having a diameter approximately one-sixth the diameter of the wheel is being used to exert the radial force against the wheel. Because the roller has such a small diameter, the force being exerted by the roller against the wheel is distributed over a considerably smaller footprint than if the force was being exerted by ground against the wheel.

In the above-described balancing apparatus, the spindle is typically located greater than one wheel diameter above the surface upon which balancing apparatus is positioned. As such, a technician using the balancing apparatus is required to lift the wheel a considerable distance to mount the wheel on the spindle. This lifting and subsequent lowering of the wheel can be particularly burdensome, as certain wheels, for example for SUVs, weigh in excess of ninety pounds. There is, therefore, a need for an improved balancing apparatus that reduces the lifting required by a technician to mount the wheel on the balancing apparatus, and a balancing apparatus that better simulates road conditions during testing.

SUMMARY OF THE INVENTION

These and other needs are met by the present invention, which in accord with one aspect is a testing system that includes a base, an arm, a spindle, at least one force sensor, and a controller. The arm is rotatably connected to the base about a pivot axis. The spindle is positioned on the arm and receives and rotates the object. The force sensor detects forces generated by the object during rotation of the object. The controller receives force information from the sensor and calculates balancing information from the force information.

By providing a movable arm, the arm can be adjusted to a position that minimizes lifting of the object onto the spindle. This can reduce the stress on an operator of the apparatus caused by lifting the object onto the apparatus, particularly when the object to be spun is heavy and/or bulky. Also, the arm can be adjusted to present the object in a number of different orientations relative to the various testing equipment on the apparatus.

In another aspect of the system, a rolling road is provided that includes a surface upon which the object can be positioned. This surface replicates the surface upon which the object may normally be rotated. The force sensor can also detect the force exerted upon the object by the moving surface, and the controller controls the magnitude of the force exerted upon the object by the moving surface. By using a conveyor belt as the moving surface, a contact surface of the moving surface, upon which the object contacts, is substantially planar, and this more closely replicates the actual surface upon which the object is normally rotated.

In yet another aspect of the system, an actuator connected to both the arm and the base moves the arm relative to the base, and movement of the actuator is controlled by the controller. In one position of the arm, the spindle is located proximate to ground upon which the base is positioned to minimize a distance the wheel is lifted by a user to position the wheel on the spindle.

In other aspects of the apparatus, the object is a wheel, and the apparatus includes a wheel debeader. The wheel debeader can be positioned on the base and can debead the wheel when the arm is in a spinning position. A wheel profiler can also be included for detecting wheel information about the wheel and transmitting the wheel information to the controller. The wheel profiler can be a vision recognition system, and the wheel information obtained by the wheel profiler includes wheel diameter, rim diameter, wheel thickness, and location of spokes on wheel.

Additional advantages of the present invention will become readily apparent to those skilled in this art from the following detailed description, wherein only an exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION OF THE PREFERRED EMBODIMENTS

Figure 1:
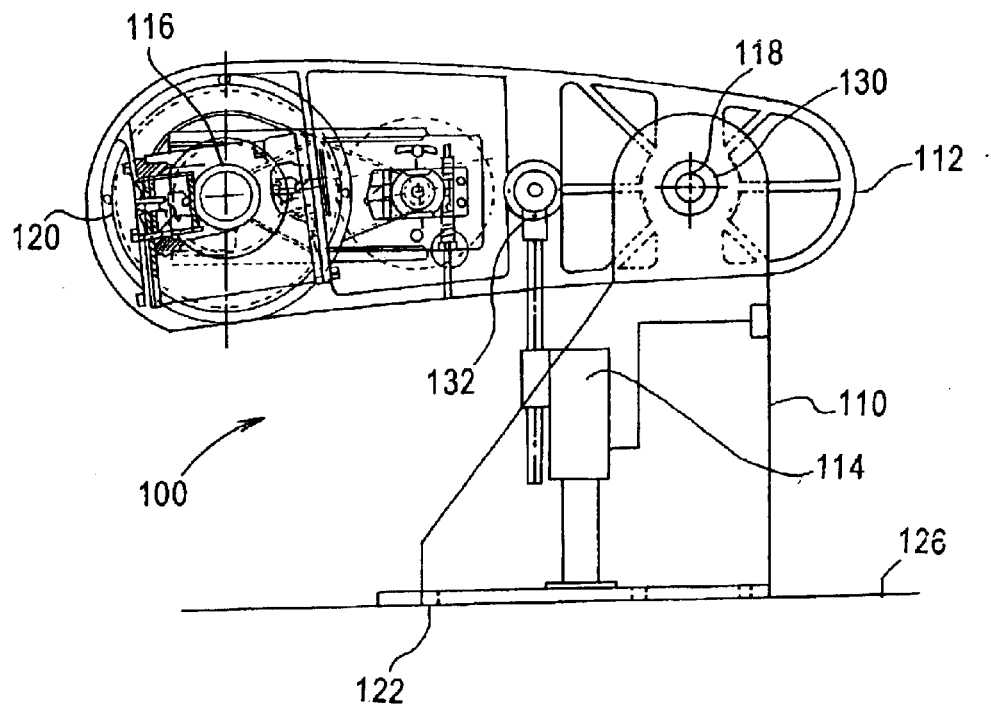
FIG. 1 is a schematic side view of a test system in accord with an embodiment of the invention.
Figure 2:
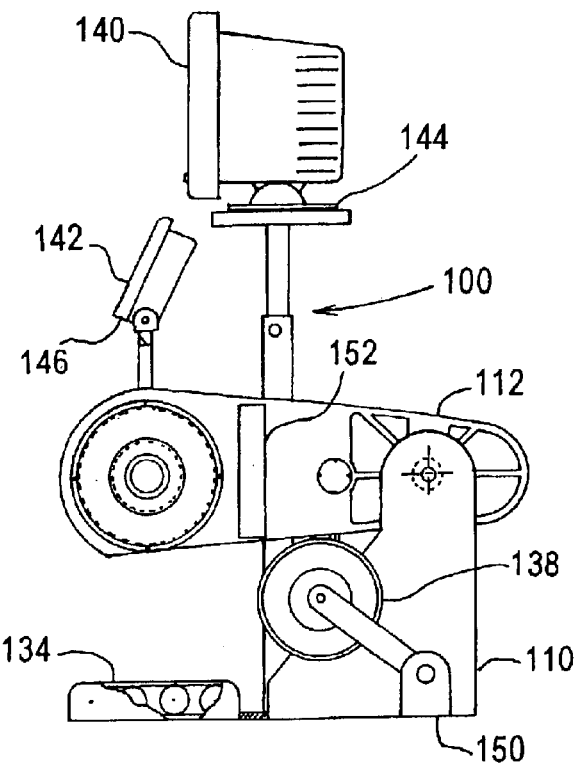
FIG. 2 is a schematic side view of another test system.

An example of a testing system, implemented in accordance with one embodiment of the invention is illustrated in FIGS. 1 and 2. The testing system 100 includes a base 110 and a spindle 116. The testing system 100 can also include, but is not limited to, an arm 112, a rolling road 134, a wheel profiler 152, a tire inflation apparatus (not shown), and a wheel demounter 138. Upon mounting a wheel 120 on the spindle 116, the wheel 120 can be spun, and balancing information can be obtained regarding the wheel 120.

In certain aspects of the testing system 100, the spindle 116 can be selectively positioned in multiple locations relative to a surface or ground 126 upon which the base 110 rests. Although the testing system 100 is not limited in the manner is which the spindle 116 is selectively positioned relative to ground 126, in certain current aspects of the testing system 100, the spindle 116 is mounted on the arm 112, which is supported by the base 110. The spindle 116 is then selectively positioned relative to ground 126 by moving the arm 112 relative to the base 110.

The testing system 100 is not limited in the manner in which the arm 112 moves relative to the base 110. For example, the arm 112 can move translationally relative to the base 110. However, in certain aspects of the testing system 100, the arm 112 rotates or pivots relative to the base 110 about a pivot axis 118, and the testing system 100 is not limited in manner in which the arm 112 rotates relative to the base 110 about the pivot axis 118. In one aspect, however, the arm 112 and the base 110 are connected via a bearing system 130, and the bearing system 130 allows rotation of the arm 112 relative to the base 110 about the pivot axis 118. Any bearing system 130 so capable is acceptable for use with the testing system 100. However, in certain aspects, the bearing system 130 is a roller bearing.

Any device capable of providing the motive force to pivot the arm 112 relative to the base 110 is acceptable for use with the testing system 100. In a current aspect, however, an actuator 114 is used to rotate the arm 112 relative to the base 110, and any actuator 114 so capable is acceptable for use with the testing system 100. For example, the actuator 114 can be a gearing system connected to the bearing system 130 that rotates the arm 112 relative to the base 110. In certain current aspects, however, the actuator 114 rotates the arm 112 relative to the base 110 by either extending or retracting in a piston-like manner. Although, as illustrated, the actuator 114 is connected to both the base 110 and the arm 112, the testing system 100 is not limited in this manner. For example, the actuator 114 can be connected to the arm 112 and also to the surface or ground 126.

The testing system 100 can also include a device, such as a controller 142, to manage the operation of the testing system 100. For example, the device or controller 142 can control the movement of the arm 112 and the spindle 116 relative to ground 126. The controller 142 can also include a database containing various information related to wheel balancing, for example tire size, tire speed rating, inflation pressure, vehicle comer weight, and past data for a given type of vehicle and/or type of wheel. It should be noted, however, that the testing system 100 is not limited as to a particular type of controller 142, and the controller 142 is also not limited as to the particular functions described above.

The controller 142 can also include input/output devices, which allow a technician or operator of the testing system 100 to interface with the controller 142 so as to operate the testing system 100. The controller 142 and input/output devices can be physically integrated with the testing system 100. Alternatively, the controller and/or input/output devices can be connected to, but physically separate from, the testing system 100. In certain current aspects of the testing system, as illustrated in FIG. 2, the controller 142 and input/output devices are incorporated into the testing system 100 as a control panel 142 and a monitor 140. Although not necessary, both the controller 142 and monitor 140 can be respectively mounted on adjustable stands 146, 144. The controller 142 is discussed in more detail below.

The controller 142 can be connected to a positioning monitoring device, such as an encoder (not shown), to determine the location of the spindle 116 or arm 112 relative to ground 126. In this manner, the controller 142 can monitor and control the movement and location of the spindle 116 and arm 112 relative to ground 126.

Figure 4:
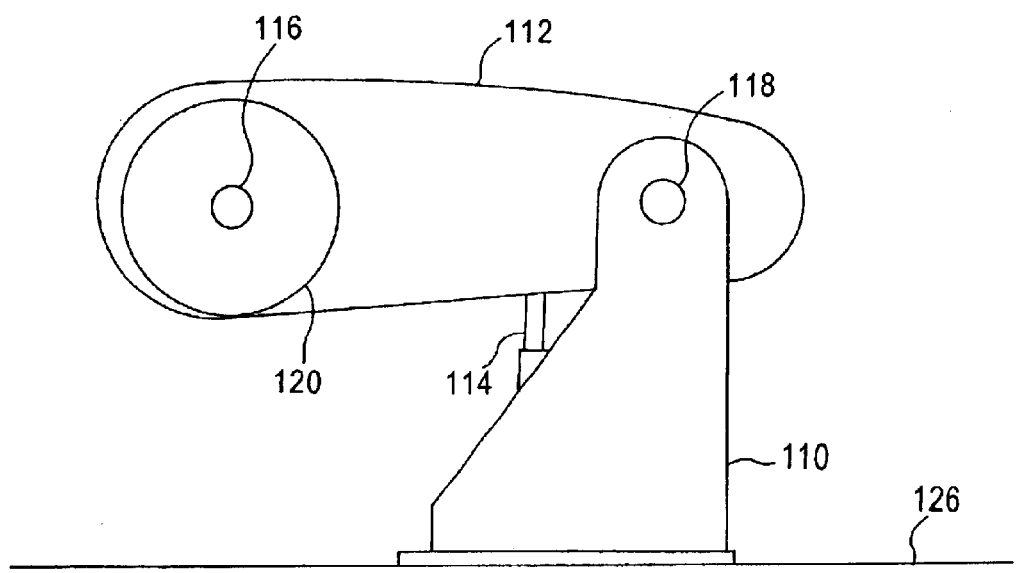
FIG. 4 is a schematic side view of the testing system of FIG. 1 in another position.
Figure 3:
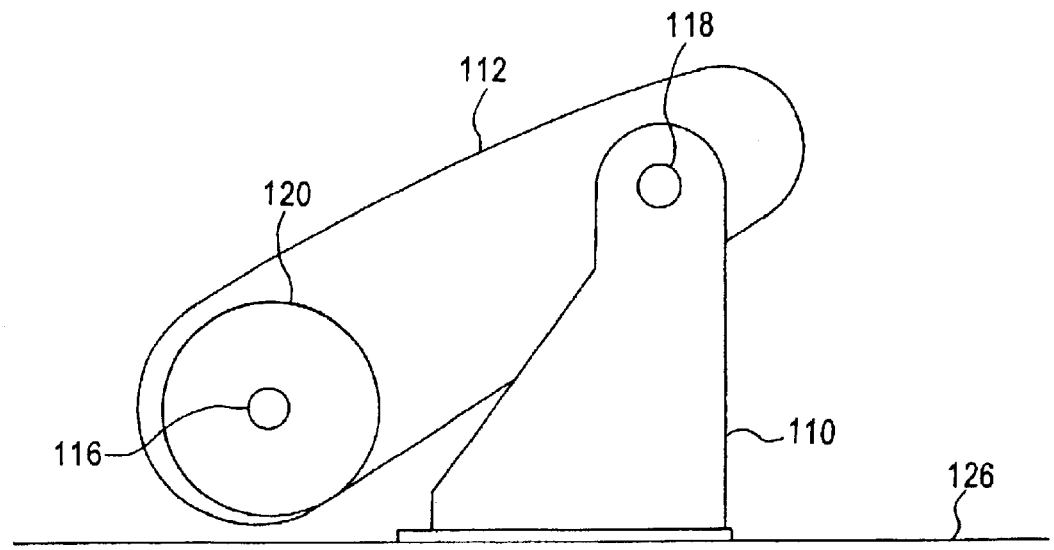
FIG. 3 is a schematic side view of the test system of FIG. 1 in one position.

As illustrated in FIGS. 3 and 4, the testing system 100 is capable of selectively positioning the spindle 116 relative to the ground 126 in multiple positions. Although the testing system 100 is not limited in the manner is which the spindle 116 is positioned relative to ground 126, in certain aspects of the testing system 100, the spindle 116 is positioned relative to ground 126 by moving the arm 112, upon which the spindle 116 is mounted, relative to the base 110.

In one position, as illustrated in FIG. 3, the spindle 116 can be located proximate to ground 126 so as to minimize a distance the wheel 120 is raised from ground to be positioned on the spindle 116. By positioning the center of the spindle 116 away from ground 126 at a distance of approximately the radius of the wheel 120, a distance the wheel 120 is lifted by a technician to position the wheel 120 on the spindle 116 is minimized or eliminated. Although the distance between the center of the spindle 116 and the ground 126 varies depending upon the size of the wheel 120, in certain aspects of the testing system 100, the distance is less than twenty-four inches. This same position can also be used when the wheel 120 is removed from the spindle 116.

In another position, as illustrated in FIG. 4, the spindle 116 can be raised relative to ground 126 to position the wheel 120 for rotation. The spindle 116 can also be located relative to the ground 126 in other positions. For example, the spindle 116 can be moved to other positions when the wheel 120 is being tested using a rolling road 134 or when using a wheel demounter 138.

Figure 5:
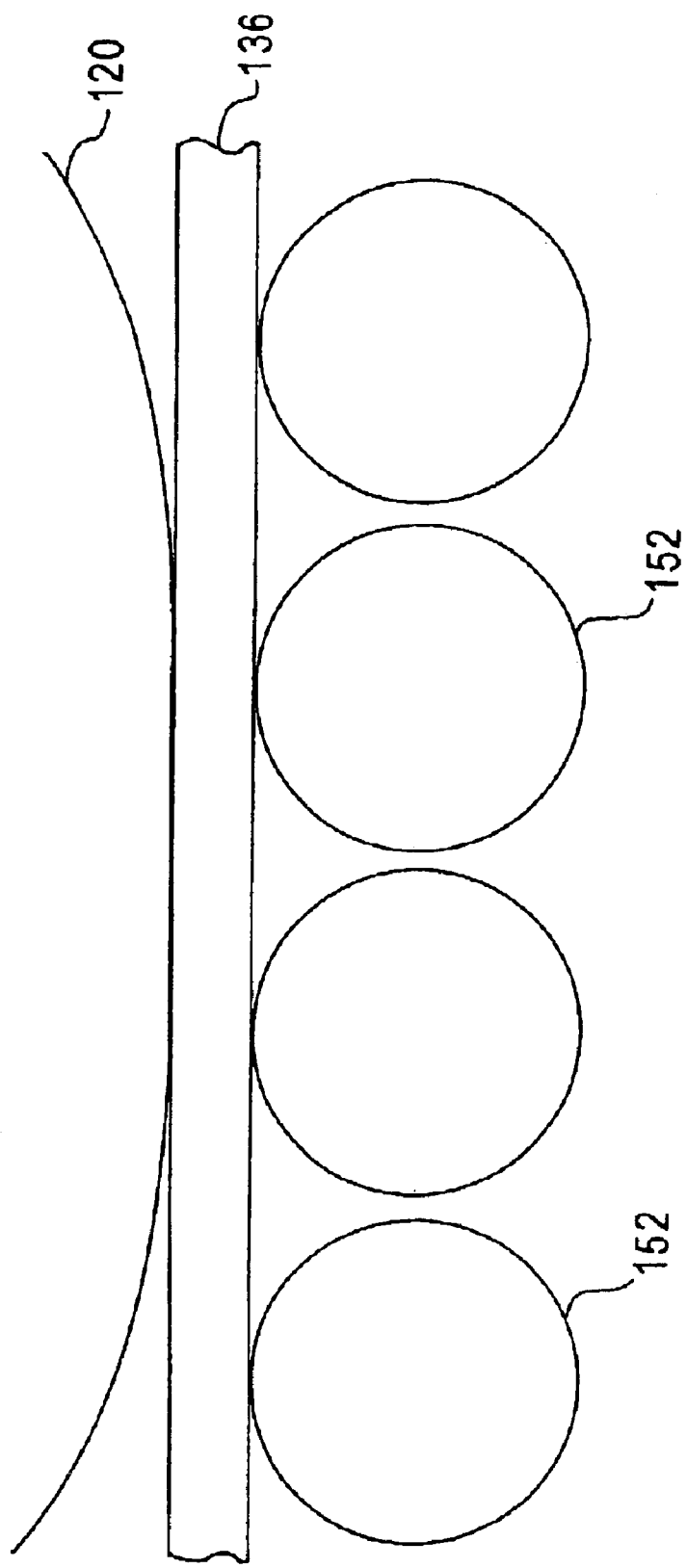
FIG. 5 is a partial schematic side view of a rolling road.

As illustrated in FIGS. 2 and 5, the testing system 100 can also include a rolling road 134. The rolling road 134 provides a surface against which the outer circumference of wheel 120 contacts during rotation of the wheel 120. In one aspect, the rolling road 134 exerts a predetermined force on the wheel 120 when the wheel 120 is rotating, and any rolling road 134 so capable is acceptable for use with the testing system 100. The force against the wheel 120 can simulate forces that the wheel 120 would experience during a road test when the wheel 120 is mounted on a vehicle.

In certain aspects of the testing system 100, the surface of the rolling road 134 is a conveyor belt 136, which is supported, for example, by a plurality of rollers 152. The conveyor belt 136 presents a surface that is substantially planar and more accurately replicates the road surface contact area or footprint that the wheel 120 would encounter during actual use of the wheel 120 on a vehicle. In contrast, previous devices for exerting force against a wheel, such as a single roller, provide a much smaller contact area. As such, by using a conveyor belt 136 to exert the predetermined force against the wheel 120, the manner in which the wheel 120 deforms more closely replicates the deformation of the wheel 120 during actual use than if the wheel 120 is deformed by a single roller.

Although shown connected to the base 110, the rolling road 134 is not limited in this manner. For example, the rolling road 134 can be positioned directly on the ground 126. Also, in one of the positions of the spindle 116 relative to ground 126, the spindle 116 can present the wheel 120 to the rolling road 134 for testing of the wheel 120.

Although any device capable of measuring the force exerted by the rolling road 134 against the wheel 120, in certain current aspects of the testing system 100, a force sensor 132 is positioned on the actuator 114 and is used to inferentially measure the force being exerted against the wheel 120 by the rolling road 134. The force sensor 132 can also be connected to the controller 142 to allow the controller 142 to actively adjust the position of the spindle 116 relative to the rolling road 134 such that a specific desired force can be exerted against the wheel 120 by the rolling road 134.

In certain modes of operation, the testing system 100 is used to test the wheel 120 and provide, if necessary, information useful in balancing the wheel 120. The rotation of the unbalanced wheel 120 in the spindle 116 creates a vibration, which can be measured to determine the degree of unbalance of the wheel 120.

The wheel 120 is connected to the arm 112 and spun. Many devices capable of receiving the wheel 120 and spinning the wheel 120 are commonly known, and the invention is not limited as to a particular device for receiving and spinning the wheel 120. In one aspect of the testing system 100, however, a spindle 116 receives the wheel 120.

During testing, when the wheel 120 is spinning, balancing measurements, such as dynamic and static imbalance, can be obtained about the wheel 120. As such, the testing system 100 can also include a device for obtaining balancing measurements, and any device capable of obtaining balancing measurements is acceptable for use with the testing system 100. Many types of devices capable of obtaining balancing measurements are known by those, skilled in the art, and the testing system 100 is not limited as to a particular device for obtaining balancing measurements. An example of a device for obtaining balancing measurements is a VPI System 3 Wheel Balancer manufactured by John Bean of Conway Ark.

When the wheel 120 is spinning, measurements regarding the roundness of the wheel 120 can also be obtained. The testing system 100 is not limited as to the manner in which the roundness of the wheel 120 can be determined. However, in certain current aspects, the testing system 100 includes a first force sensor 132 that measures forces on the arm 112. The spinning of an out-of-round wheel 120 will exert forces on the arm 112, and these forces can be measured by the first force sensor 132. Although not limited in this manner, the first force sensor 132 can be located on the actuator 114 or on the base 110.

To prevent the vibration from destabilizing the testing system 100, the base 110 is fixed to a surface or ground 126, and any base 110 so capable is acceptable for use with the testing system 100. In one aspect, however, the base 110 includes a bottom plate 122 fixed to the surface 126 extending from the bottom plate 122. The testing system 100 is not limited in the manner in which the bottom plate 122 is fixed to the surface bottom plate 122. However, in one aspect, the bottom plate 122 is fixed to the surface using anchor bolts (not shown) through anchor holes in the bottom plate 122.

The testing system 100 can also include a wheel demounter 138, also known as a tire debeader. A tire is typically sealed to the rim by a bead, which is generally wire reinforced and resists deformation. For this purpose, the bead has a diameter that is somewhat less than the diameter of the wheel rim flange and is positioned between the spaced flanges of the wheel rim. To break the seal between the tire and rim, the beads are unsealed or "broken" by moving the beads axially inward. The tire can then be repositioned on the rim or removed entire from the rim. As is known to those skilled in the art, many types of wheel demounters 138 are capable of loosening or removing the tire from its rim, and the testing system 100 is not limited as to a particular type of wheel demounter 138. Although not limited in this manner, the wheel demounter 138 is attached to the base 110 of the testing system 100, for example, with a mount 150 that allows movement of the wheel demounter 138 relative to the base 110.

One advantage of including a wheel demounter 138 with the testing system 100 is that the wheel demounter 138 allows a user of the testing system 100 to adjust the tire on the rim without removing the wheel 120 from the testing system 100. In so doing, for example, the user can properly locate and adjust low and high points of the tire and rim without having to remove and remount the wheel 120 on the testing system 100.

Upon obtaining the balancing measurements, a process, sometimes known as optimization, can be used to enable a technician to properly locate the tire on the rim. After obtaining the optimized tire to rim position, both the tire and rim are marked prior to adjusting the tire on the rim. Although any method of marking the tire and rim is acceptable for use with the testing system 100, in a current aspect, the wheel 120 and rim are each marked with a laser (not shown), which can be positioned on or off the testing system 100. Once marked, the tire can be adjusted on the rim using the wheel demounter 138 such that the tire and rim are in an optimized position relative to each other. The tire can then be reinflated and subjected to additional testing, such as spinning for final balancing.

The testing system 100 can also use a wheel profiler 152. As known by those skilled in the art, a wheel profiler 152 is a vision recognition system that visually obtains tire information, such as tire diameter, thickness of the tire, and where the tire is located relative to the rim. This information can then be automated provided to the controller 142. The wheel profiler 152 can be positioned adjacent to the testing system 100, or as illustrated in FIG. 2, the wheel profiler 152 can be attached to the base 110.

Figure 6:
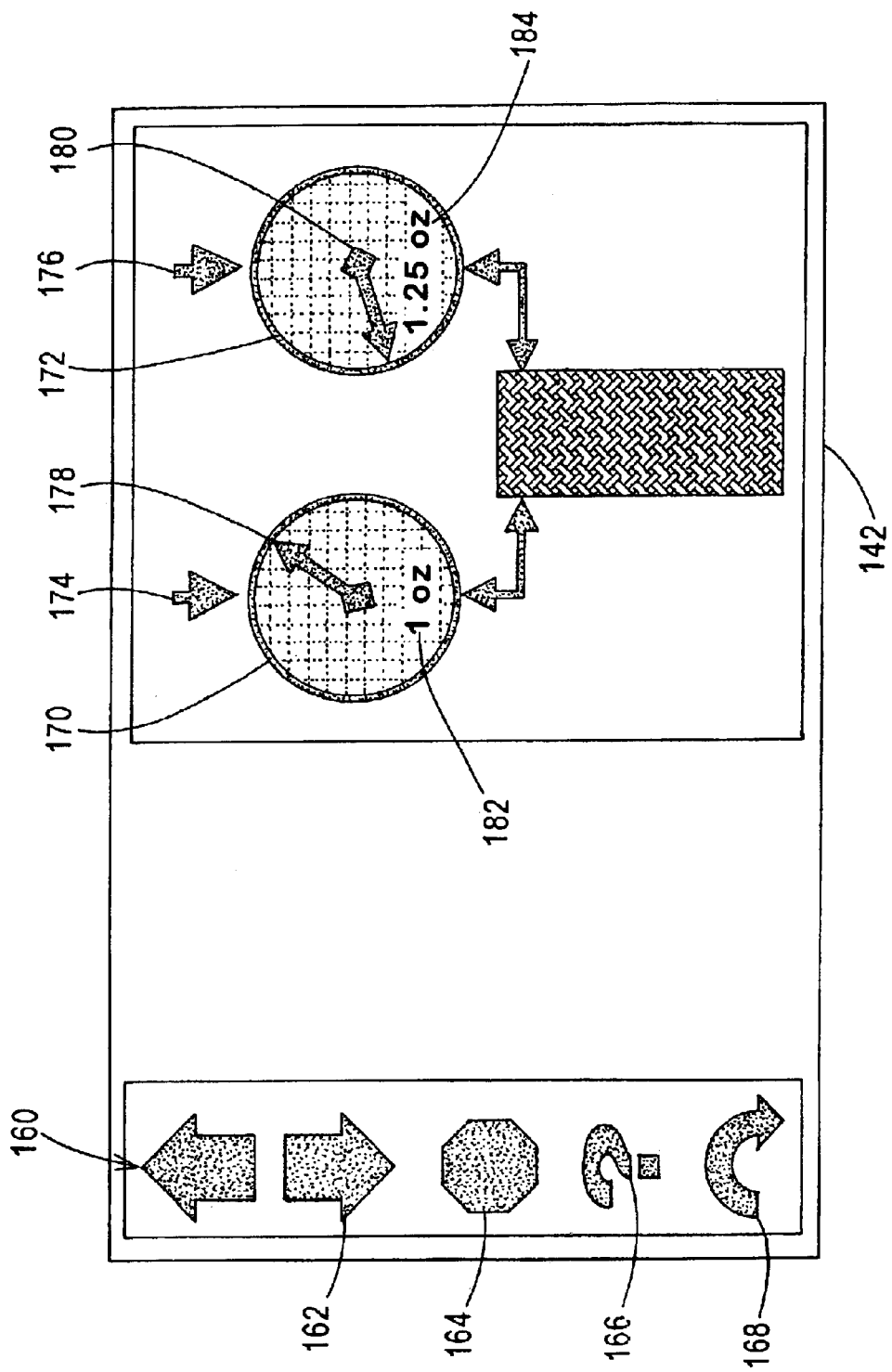
FIG. 6 is a front view of a control panel.

An illustrative example of the controller 142 is shown in FIG. 6. It should be understood, however, that the controller 142 is not limited to the particular layout illustrated or the features shown on the controller 142. The controller 142 includes up and down arrows 160, 162 for positioning the spindle 116 up and down. Start and stop buttons 164, 168 are included for starting and stopping the spinning of the spindle 116 and wheel 120. A help button 166 is including for providing help information to an operator of the testing system 100. The controller 142 also includes two meters 174, 176, which are respectively used for the inside and outside of the wheel 120. Each indicator 174, 176 includes a direction needle 178, 180, a top dead center (TDC) indicator 174, 176, and a weight indicator 182, 184. After the wheel 120 is spun and the balancing information calculated, the two meters 174, 176 indicate the locations on the inside and outside of the wheel 120 where weights are to be placed to balance the wheel 120.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only an exemplary aspect of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. An apparatus for determining balancing information of an object in rotation, comprising:
   a base;
   a spindle for receiving and rotating the object;
   an arm to which the spindle is connected;
   at least one force sensor for detecting forces generated by the object during rotation of the object;
   a rolling road including a moving surface; and
   a controller for receiving force information from the at least one force sensors and calculating the balancing information from the force information, wherein
   the spindle is positionable relative to the base in any one of multiple positions, and throughout the multiple positions, a rotational axis of the spindle is substantially parallel to the moving surface, and
   in one of the multiple positions, the arm positions the object to contact the moving surface and the moving surface exerts a force upon the object.

2. The apparatus according to claim 1, wherein one of the at least one force sensors detects the force exerted upon the object by the moving surface, and the controller controls the magnitude of the force exerted upon the object by the moving surface.

3. The apparatus according to claim 1, wherein the moving surface is a conveyor belt.

4. The apparatus according to claim 1, wherein a contact surface of the moving surface, upon which the object contacts, is substantially planar.

5. The apparatus according to claim 1, further comprising an actuator connected to the arm and the base, the actuator moving the arm relative to the base and the movement of the actuator being controlled by the controller.

6. The apparatus according to claim 5, wherein the arm rotates relative to the base about a pivot axis connecting the arm to the base.

7. The apparatus according to claim 5, wherein one of the at least one force sensor detects the force exerted upon the object by a moving surface, and the controller controls the magnitude of the force exerted upon the object by the moving surface.

8. The apparatus according to claim 7, wherein the force sensor for detecting the force exerted upon the object by the moving surface is positioned on the actuator.

9. The apparatus according to claim 5, wherein
   the arm is positionable relative to the base in a loading position and in a spinning position, and
   in the loading position, the object is loaded and unloaded onto the spindle, and
   in the spinning position, the object is rotated to determine the balancing information.

10. The apparatus according to claim 9, wherein in the loading position, the spindle is closer to ground upon which the base is positioned than the spindle to the ground in the spinning position.

11. The apparatus according to claim 9, wherein the object is a wheel, and further comprising a wheel demounter.

12. The apparatus according to claim 9, wherein the wheel demounter is positioned on the base and can debead the wheel when the arm is in the spinning position.

13. The apparatus according to claim 1, wherein in one of the multiple positions of the arm, the spindle is located proximate to ground upon which the base is positioned.

14. The apparatus according to claim 13, wherein the object is a wheel having a radius, and in one of the multiple positions of the arm, a center of the spindle is located at a distance less than twenty four inches from the ground to minimize a distance the wheel is lifted by a user to position the wheel on the spindle.

15. The apparatus according to claim 1, wherein the object is a wheel, and the apparatus further comprises a wheel profiler for detecting wheel information about the wheel and transmitting the wheel information to the controller.

16. The apparatus according to claim 15, wherein the wheel profiler is a vision recognition system.

17. The apparatus according to claim 15, wherein the wheel information includes at least one of wheel diameter, rim diameter, wheel thickness, and location of spokes on wheel.

18. An apparatus for determining balancing information of an object in rotation, comprising:
    a base;
    an arm rotatably connected to the base about a pivot axis;
    a spindle for receiving and rotating the object, the spindle positioned on the arm;
    at least one force sensor for detecting forces generated by the object during rotation of the object;
    a rolling road including a moving surface;
    a controller for receiving force information from the at least one sensor and calculating the balancing information from the force information; and
    an actuator connected to both the arm and the base, the actuator moving the arm relative to the base and the movement of the actuator being controlled by the controller, wherein
    the arm is positionable relative to the base in one of multiple positions, in one of the multiple positions, the arm positions the object to contact the moving surface on a substantially planar contact surface and the moving surface exerts a force upon the object,
    in a loading position of the multiple positions, the object is loaded and unloaded onto the spindle,
    in a spinning position of the multiple positions, the object is rotated to determine the balancing information, and
    one of the at least one force sensors detects the force exerted upon the object by the moving surface, and the controller controls the magnitude of the force exerted upon the object by the moving surface via the actuator.

19. The apparatus according to claim 18, wherein the object is a wheel, and further comprising a wheel demounter.

* * * * *